Jan. 9, 1945.  M. P. PFEIL  2,366,929
FLOATING SIGNAL LIGHT
Filed Oct. 31, 1942
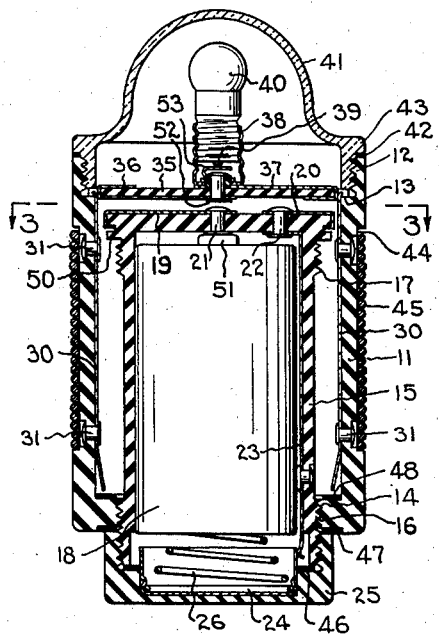
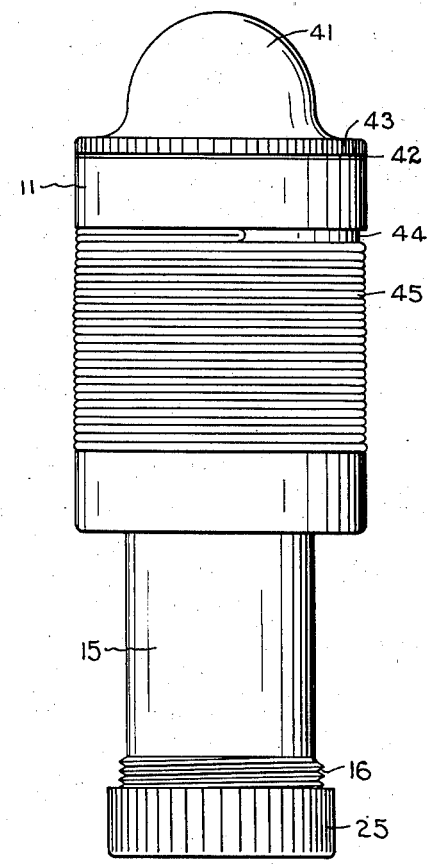
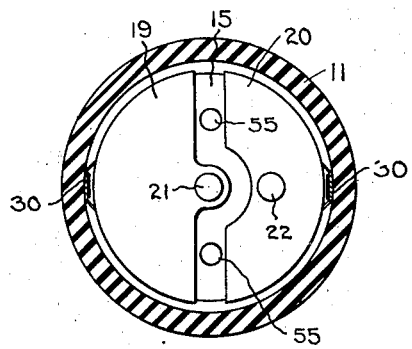
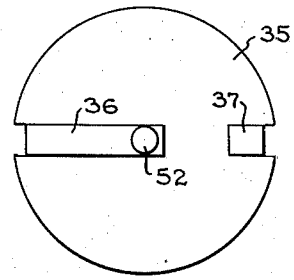
INVENTOR.
MELVIN P. PFEIL.
BY
H.C. Karl.
ATTORNEY.

Patented Jan. 9, 1945

2,366,929

UNITED STATES PATENT OFFICE 2,366,929

FLOATING SIGNAL LIGHT

Melvin P. Pfeil, Cincinnati, Ohio

Application October 31, 1942, Serial No. 464,124

8 Claims. (Cl. 9—8.3)

This invention relates to a floating signal light of small proportions which can be carried for emergencies in the event of a wreck at sea. The light is so arranged that it can be attached by a cord to the user's life belt or raft, and arranged to float substantially in a vertical position to identify his position at night to searching planes. At the present time, a person wrecked at sea has very little chance of being found at night, but with my improvement, he can set out one or more lights and even if he becomes unconscious, planes searching for him can more readily locate his position.

The object of my invention is to provide a compact signal light with means for extending the casing to provide an air compartment to float the device.

A further object is to provide means for anchoring the light.

A still further object is to provide the light with an air compartment and a battery compartment and means whereby said battery compartment is received in said air compartment when the light is not in use.

A still further object is to provide means for automatically illuminating the light upon extension of the battery compartment and to extinguish the light upon retraction of the battery compartment.

My invention will be further readily understood from the following description and claims and from the drawing, in which latter:

Fig. 1 is a longitudinal cross-section of my improved device, with the battery compartment received within the air compartment.

Fig. 2 is a side elevation of the device in extended position for use.

Fig. 3 is a cross-sectional view, taken in the plane of the line 3—3 of Fig. 1, and;

Fig. 4 is a bottom view of the lamp supporting disc.

My improved floating light comprises a tubular housing 11 provided with upper internal threads 12 extending upwardly from a rabbet 13. The lower end of the housing 11 is provided with internal threads 14 arranged to receive a battery housing 15. The battery housing 15 is provided with spaced apart external threads 16 and 17 arranged to mate with the internal threads 14.

The battery compartment 15 is arranged to receive a standard dry cell battery 18. The battery housing 15 is provided with a pair of contact members 19 and 20 on the upper face thereof, being secured thereto as by rivets 21 and 22. The rivet 22 also secures an internal contact member 23 within the battery compartment for forming a contact with a cup 24 secured in a cap 25 which is threaded to the lower end of the battery compartment. A spring 26 within the cup 24 forms an electrical connection between the base of the battery and the cup.

Secured within the outer housing 11 are a pair of vertical contact strips 30 secured to the housing as by rivets 31. The lower ends of these bars extend inwardly to provide contact with the members 19 and 20 when the battery compartment is brought to a position whereby the threads 17 are in engagement with the threads 14.

A lamp mounting disc 35 is held in the rabbet 13 and has a pair of contact strips 36 and 37 secured thereto forming contacts with the upper ends of the bars 30. The bars are suitably insulated from each other to form an electrical connection to the lamp socket 38 and the lamp contact 39. A lamp 40 is received in the socket 38. A lens 41 is threaded into the upper end of the housing 11 having a gasket 42 interposed between the peripheral flange 43 of the lens and the upper margin of the housing 11 to form a water-tight seal between the lens and housing. The lens also maintains the lamp mounting disc in position.

The major portion of the outer periphery of the housing 11 is recessed as at 44 to provide for the attachment and winding of the cord 45 thereabout. Suitable gaskets 46 and 47 and 48 are provided to form water proof seals between the battery housing and the cap and between the battery housing and the outer casing in its retracted or extended position.

When the battery housing is received within the housing 11 as shown in Fig. 1, the electrical contacts between the battery and the lamp are separated preventing operation of the lamp. However, when it is desired to use the floating signal, the battery compartment is rotated to disengage the threads 16 from the threads 14. The battery housing is drawn outwardly and the threads 17 engaged with the threads 14 until the peripheral flange 50 on the battery housing seals against the gasket 48 at which time contacts 19 and 20 will contact the respective strips 30 completing an electrical connection from the battery through the spring 26, the cup 24, the contact strip 23, the rivet 22, the contact member 20, the strip 30, through the contact member 37, to the lamp socket 38. At the same time contact will be made from the other contact 51 of the battery through the rivet 21, contact member 19, the strip 30, contact member 36, to the rivet 52, a spring contact 53, to the contact 39, of the lamp 40 whereby the lamp will glow for the life of the battery when the battery compartment is in extended position.

The upper face of the battery compartment 15 is provided with apertures 55 to permit the insertion of a suitable tool to aid in the removal of the battery.

The cord 45 is provided to provide means of attaching the floating light to a life raft or other floating device to which the user is dependent on maintaining his buoyancy.

Having thus fully described my invention what I claim as new and desire to secure by Letters Patent, is:

1. A floating signal light comprising a casing, a lamp, a lens over said lamp, a battery compartment, a battery in said compartment, means on said battery compartment for locking said compartment within said casing, and further means on said battery compartment for positioning said compartment in extended relation with said casing and means for forming an electrical connection between said battery and said lamp when said battery compartment is extended.

2. A floating signal light comprising a lamp housing, a lamp supported in said housing, a battery housing, a battery in said housing, means for securing said battery housing within said lamp housing, means for securing said battery housing in extended relation to said lamp housing, and means on said housings for forming an electrical connection between said lamp and battery when said housings are in extended relation.

3. A floating signal light comprising a pair of telescoping members arranged to be telescoped or extended, a battery in one of said members, a light in the other member, and means for forming a waterproof seal between said members in both telescoped and extended positions.

4. A floating signal light comprising a pair of telescoping members arranged to be telescoped or extended, a battery in one of said members, a light in the other member, means for forming a waterproof seal between said members in both telescoped and extended positions, and electrical connections between said battery and light for automatically illuminating said light upon extension of said members.

5. A floating signal light comprising a sealable air compartment, a battery compartment, spaced threaded portions on said battery compartment, and a cooperating threaded portion in said air compartment whereby said battery compartment can be inserted in said air compartment or extended therefrom.

6. A floating signal light comprising a sealable air compartment, the major portion of the outer periphery of said compartment recessed, a battery compartment, spaced threaded portions on said battery compartment, a cooperating threaded portion in said air compartment whereby said battery compartment can be inserted in said air compartment or extended therefrom, and a cord wrapped around said air compartment recess extendable for use.

7. A floating signal light comprising a sealable air compartment, a battery compartment, spaced threaded portions on said battery compartment, a cooperating threaded portion in said air compartment whereby said battery compartment can be inserted in said air compartment or extended therefrom, and a lamp compartment above said air compartment.

8. A floating signal light comprising a pair of casings, a lamp attached to one of said casings, a battery in the other casing, electrical connections in said casings, said battery casing having spaced threaded portions thereon, said other casing provided with internal threads engageable with either threaded portion of said battery casing for securing said casings in extended or telescoped relation to each other, and said electrical connections forming a circuit between said lamp and battery when said casings are in extended position.

MELVIN P. PFEIL.